United States Patent
Saeki

(10) Patent No.: US 6,377,393 B1
(45) Date of Patent: Apr. 23, 2002

(54) OPTICAL AMPLIFIER APPARATUS, OPTICAL TRANSMISSION APPARATUS EQUIPPED WITH BREAK POINT DETECTING FUNCTION USING OPTICAL AMPLIFIER APPARATUS, AND BIDIRECTIONAL OPTICAL TRANSMISSION APPARATUS

(75) Inventor: Miwa Saeki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/435,635

(22) Filed: Nov. 8, 1999

(30) Foreign Application Priority Data

Nov. 13, 1998 (JP) .......................................... 10-323913

(51) Int. Cl.[7] .................................................. H01S 3/00
(52) U.S. Cl. ...................................................... 359/341.2
(58) Field of Search ................................ 359/337, 341, 359/39, 42; 385/39, 42

(56) References Cited

U.S. PATENT DOCUMENTS

| | | | | |
|---|---|---|---|---|
| 5,504,617 A | * | 4/1996 | Spirit | 359/341 |
| 5,548,438 A | * | 8/1996 | Delaveux | 359/341 |
| 5,636,054 A | * | 6/1997 | Artigaud et al. | 359/341 |
| 5,822,113 A | * | 10/1998 | Delaveux | 359/341 |
| 5,887,091 A | * | 3/1999 | Jabr et al. | 385/24 |
| 6,310,718 B1 | * | 10/2001 | Saeki | 359/341.2 |

FOREIGN PATENT DOCUMENTS

| | | |
|---|---|---|
| EP | 0 535 590 A2 | 4/1993 |
| EP | 0 729 248 A2 | 8/1996 |
| JP | 4-238328 | 8/1992 |
| JP | 4-240830 | 8/1992 |
| JP | 5-29685 | 2/1993 |
| JP | 5-102583 | 4/1993 |
| JP | 5-216078 | 8/1993 |
| JP | 5-341233 | 12/1993 |
| JP | 6-51242 | 2/1994 |
| JP | 7-209678 | 8/1995 |
| JP | 8-54580 | 2/1996 |
| JP | 9-508495 | 8/1997 |

OTHER PUBLICATIONS

Y. Sato et al., "OTDR in Optical Transmission Systems Using Er–Doped Fiber Amplifiers Containing Optical Circulators", IEEE Photonics Technology Letters, vol. 3, No. 11, Nov. 1991, pp. 1001–1003.*

Y. Sato et al., "Optical Time Domain Reflectometry in Optical Transmission Lines Containing In–Line Er–Doped Fiber Amplifiers", Journal of Lightwave Technology, vol. 10, No. 1, Jan. 1992, pp. 78–83.*

N. Kishi et al., "Fiber–Optic Transceiver with an Optical Circulator for Optical Time–Domain Reflectometers", IEEE Journal of Selected Topics in Quantum Electronics, vol. 3, No. 4, Aug. 1997, pp. 1045–1048.*

* cited by examiner

Primary Examiner—Thomas H. Tarcza
Assistant Examiner—Deandra Hughes
(74) Attorney, Agent, or Firm—McGinn & Gibb, PLLC

(57) ABSTRACT

An optical amplifier apparatus is provided with an optical amplifier and a 4-port optical circulator. The optical amplifier optically amplifies first signal light entered from an input port thereof, and then outputs the first amplified signal light from an output port thereof. The optical circulator contains first to fourth ports, and sequentially outputs light that is inputted from each of these first to fourth ports to the next port thereof. The input port of the optical amplifier is connected to the second port, and the output port thereof is connected to the third port. An optical transmission apparatus having a break point detecting function is provided with an optical time domain reflectometer for outputting an optical pulse along the same direction as that of the first signal light in addition to the optical amplifier apparatus and an optical transmitter module.

5 Claims, 4 Drawing Sheets

OPTICAL AMPLIFIER APPARATUS, OPTICAL TRANSMISSION APPARATUS EQUIPPED WITH BREAK POINT DETECTING FUNCTION USING OPTICAL AMPLIFIER APPARATUS, AND BIDIRECTIONAL OPTICAL TRANSMISSION APPARATUS

BACKGROUND OF THE INVENTION

1. Field of the Invention

The present invention is related to an optical amplifier apparatus capable of transmitting signal light in a bidirectional manner, to an optical transmission apparatus equipped with a break point detecting function using this optical amplifier apparatus, and also to a bidirectional optical transmission apparatus.

2. Description of the Related Art

In optical amplifiers using optical fibers as amplifying media, optical amplifying operations of these optical amplifiers are adversely influenced by light returned from reflection points existed inside these optical amplifiers and optical transmission paths. When such return light appears, the optical amplifiers own a problem. That is, the optical amplifying operations of these optical amplifiers are brought into unstable conditions, and in the worst case, the optical amplifiers would be oscillated. In general, in order to suppress such reflection/return light originated from this reflection point, optical isolators having coreactive effects are arranged at input/output units of an optical fiber amplifier.

However, when such an optical isolator is arranged, the optical fiber amplifier will have directivity due to the coreactive effect itself. Therefore, this optical fiber amplifier may cut off signal light traveling along a reverse direction opposite to the original travel direction. That is, as to signal light traveling along the original travel direction, the optical amplifying operation of this optical amplifier becomes effective, so that this signal light may be transmitted. However, as to signal light traveling along the reverse direction opposite to the original travel direction, this signal light is cut off in the optical amplifier. As a result, this optical amplifier cannot perform the bidirectional optical transmission. To avoid this drawback, a plurality of optical circulators are necessarily required to be combined with the optical amplifiers. Thus, the overall optical system would become complex. Furthermore, with respect to a unidirectional optical transmission, for example, there is another problem that conditions of optical fiber transmission paths cannot be checked by employing an optical time domain reflectometer (OTDR). In the case that a break point is detected so as to measure a transmission path loss occurred in an optical fiber transmission path and/or to perform maintenance of an optical fiber transmission path, an optical pulse is entered from a transmission end into this optical fiber transmission path, and a light level of a returned optical pulse is monitored in a time sequential manner. As a result, the transmission path loss of this optical fiber transmission path is detected, a check is made as to whether or not such a break point is present, and if such a break point is detected, then a distance up to this break point is measured.

However, as previously described, in the case that the optical amplifier containing the optical isolator is arranged in the optical fiber transmission path, since the return light is cut off by this optical isolator, it is not possible to detect another break point existed in the optical fiber transmission path subsequent to the optical amplifier along the light travel direction.

Also, in an optical communication system containing an optical amplifier, an upstream signal is cut off by means of an optical isolator built in the optical amplifying unit. Accordingly, a bidirectional optical transmission system cannot be established.

SUMMARY OF THE INVENTION

An object of the present invention is to provide an optical amplifying apparatus applicable to a bidirectional optical transmission, and also operable in such a case that while signal light is transmitted along an original transmission direction, signal light is wanted to be transmitted along a reverse direction opposite to this original transmission direction. For instance, a condition of as optical transmission path is checked by an OTDR.

An optical amplifier apparatus, according to an aspect of the present invention, is featured by comprising an optical amplifier for optically amplifying first signal light entered from an input port thereof and for outputting the first amplified signal light from an output port thereof, and a 4-port optical circulator. In this case, the optical circulator has a first port, a second port, a third port, and a fourth port. Then, light entered from the respective ports is sequentially outputted to the next port. The input port of the optical amplifier is connected to the second port, and the output port thereof is connected to the third port.

The optical amplifier apparatus of the present invention is further comprised of a first optical isolator arranged at a pre-stage of the optical amplifier, and a second optical isolator arranged at a post-stage of the optical amplifier.

Also, an optical amplifier apparatus, according to another aspect of the present invention, is featured by comprising an optical amplifier for optically amplifying first signal light inputted from an input port thereof and for outputting the first amplified signal light from an output port thereof, and an optical circulator equipped with at least four ports through which light is inputted/outputted, in which light inputted from a first port thereof is outputted form another port thereof. Then, the input port of the optical amplifier is connected to the second port among the four ports, and the output port of the optical amplifier is connected to the third port, the first signal light is entered to the first port for outputting light to the second port, second signal light is entered to the fourth port for outputting the light inputted to the third port, and the second signal light is outputted form the first port.

An optical transmission apparatus equipped with a break point detecting function, according to another aspect of the present invention, is featured by comprising the above-explained optical amplifier apparatus, a first optical transmitter module for transmitting the first signal light, and an optical time domain reflectometer for outputting an optical pulse along the same direction as that of the first signal light. In this case, this optical time domain reflectometer is comprised of an optical pulse light source for outputting the optical pulse, an optical coupler for coupling the first signal light to the optical pulse, and a light receiver module for receiving light returned by the optical pulse.

Also, a bidirectional optical transmission apparatus, according to another aspect of the present invention, is featured by comprising the above-described optical amplifier apparatus, a first optical transmitter module for transmitting the first signal light, a second optical transmitter module for transmitting the second signal light, a first optical receiver module for receiving the amplified signal light outputted from the optical amplifier apparatus, and a second optical receiver module for receiving the second signal light. In this arrangement, the bidirectional transmission apparatus is further comprised of a bidirectional optical amplifying relay device for optically amplifying the first signal light and the second signal light.

The optical amplifier apparatus of the present invention employs such an arrangement that the input and output sides of the optical amplifier are connected to a single 4-port optical circulator. With employment of such an arrangement, the signal light which should travel along the original transmission direction is detoured in such a manner that this signal light is entered via the 4-port optical circulator into the optical amplifier. On the other hand, the signal light which travels along the reverse direction opposite to the original transmission direction is shortcircuited in the 4-port optical circulator, while being not detoured along the direction of the optical amplifier, and then, is directly outputted to the optical fiber transmission path.

As a result, for instance, in the case that the break point of the optical fiber transmission path is intended to detect by using the optical time domain reflectometer (OTDR), the optical pulse may pass through the optical amplifier in the outgoing path along which this optical pulse is transmitted. On the other hand, the return light is shortcircuited, and then is returned to the optical time domain reflectometer without passing through the optical amplifier. Thereafter, the return light is received by the light receiving device. As a consequence, it is possible to carry out a test similar to the normal break point detection for the optical fiber transmission path.

Also, in the bidirectional optical transmission system, for example, the downstream signal light is caused to pass through the optical amplifier, and then this downstream signal light can be optically amplified. Even in this case, since the upstream signal light does not pass through the optical amplifier, this upstream signal light can be optically transmitted without being cut off. In this arrangement, the upstream signal light cannot be optically amplified. However, if the transmission capacity of the downstream line is made asymmetrical to that of the upstream line, and the optical amplifying operation is required only for the downstream line, the above-described arrangement may have effectiveness. In addition, by combining the optical amplifying relay device, which is capable of optically amplifying the signal light in a bidirectional manner, with the optical amplifier apparatus of the present invention, it is possible to optically amplify only the signal light that is needed with respect to each of the upstream/downstream lines.

BRIEF DESCRIPTION OF THE DRAWINGS

The above and other objects, features and advantages of the present invention will becomes more apparent from the following detailed description when taken in conjunction with the accompanying drawings wherein.

DETAILED DESCRIPTION OF THE PREFERRED EMBODIMENTS

Referring now to drawings, various preferred embodiments of the present invention will be described.

Optical Amplifier Apparatus

Figure 1:
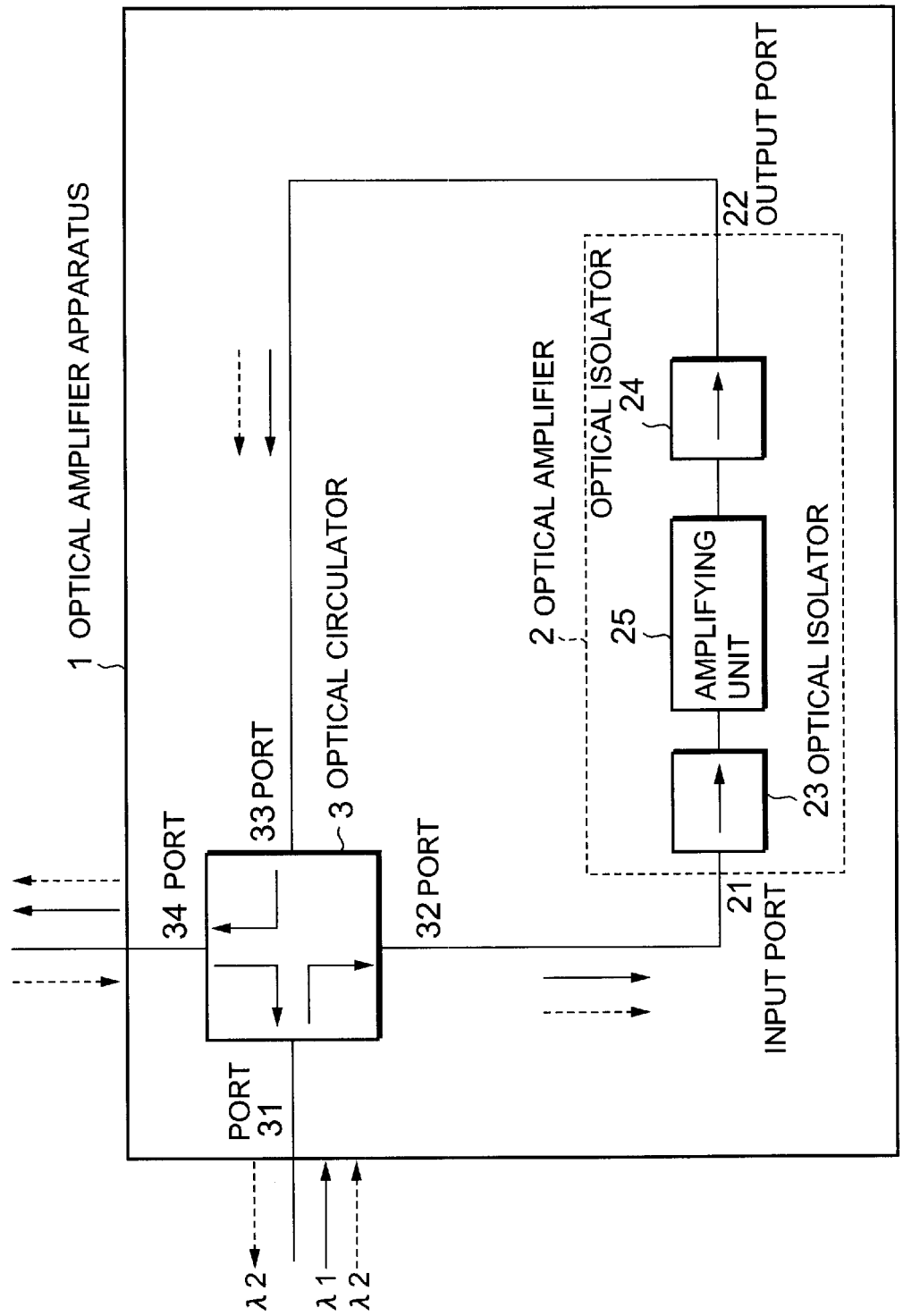
FIG. 1 is a schematic diagram showing an arrangement of an optical amplifier apparatus according to an embodiment of the present invention.

FIG. 1 is a structural diagram showing a structure of an optical amplifier apparatus according to an embodiment of the present invention. This optical amplifier apparatus of the present invention is comprised of a 4-port optical circulator 3 and an optical amplifier 2. The optical circulator 3 employed in this optical amplifier apparatus contains 4 ports, namely ports 31 to 34. Light entered from the port 31 is outputted to the port 32, light entered from the port 33 is outputted to the port 34, and then light entered from the port 34 is outputted to the port 31. It should be understood that this optical circulator may be arranged as a complete circulating type circulator in such a way that the light entered from the port 32 is outputted to the port 33. However, as will be discussed later, since the optical amplifier 2 is arranged between the port 32 and the port 33 in the optical amplifier apparatus according to the present invention, such a complete circulating type optical circulator is necessarily employed.

In the optical amplifier apparatus 1 with employment of the above-described arrangement, an input port 21 of the optical amplifier 2 is connected to the port 32 of the optical circulator 3. An output port 22 of this optical amplifier 2 is connected to the port 33 of the optical circulator 3. The optical amplifier 2 is provided with an amplifying unit 25. Thus, signal light which is entered from the input port 21 of this optical amplifier 2 is optically amplified by the amplifying unit 25 and then the amplified signal light is outputted from the output port 22 of this optical amplifier 2.

The amplifying unit 25 may be arranged by such an optical fiber amplifier equipped with an amplifying optical fiber (for example, erbium doped fiber), a pumping light source for outputting pumping light, and a wavelength division multiplexer. The wavelength division multiplexer multiplexes signal light on pumping light to project the wavelength-division-multiplexed light to the amplifying optical fiber. Also, the amplifying unit 25 may be realized by a forward pumping type amplifying unit, a backward pumping type amplifying unit, or a bidirectional pumping type amplifying unit. Alternatively, this amplifying unit 25 may be a semiconductor amplifier constructed of an optical semiconductor element.

In this embodiment, in order to eliminate an adverse influence caused by return light, two sets of optical isolators 23 and 24 are arranged at a pre-stage and a post-stage of the amplifying unit 25. These optical isolators 23 and 24 may cause signal light directed to an arrow direction (see FIG. 1) to pass through these optical isolators 23 and 24. As a result, even when light is entered from the port 33 of the optical circulator 3, this input light cannot be outputted to the port 32 thereof.

Assuming now that signal light having a wavelength "1" (hereinafter referred to as "downstream signal light" hereinafter) is entered from the port 31 of the optical circulator 3, this downstream signal light is outputted to the port 32 of the optical circulator 3, and then is optically amplified by the optical amplifier 2. This amplified downstream signal light is entered to the port 33 of this optical circulator 3, and is thereafter outputted from the port 34 thereof to the optical transmission path. On the other hand, signal light which is entered from the optical transmission path connected to the port 34 of the optical circulator 3 (will be referred to as "upstream signal light" hereinafter) is outputted from the port 31 of this optical circulator 3. As a result, this upstream signal light is not transmitted via the optical amplifier 2. Accordingly, this upstream signal light is neither blocked by the optical isolators 23 and 24, nor gives an adverse influence to the optical amplifying operation of this optical amplifier apparatus 1.

Optical Transmission Apparatus Equipped With Break Point Detecting Function

Next, a description will now be made of an optical transmission apparatus equipped with a break point detecting function, according to an embodiment of the invention, with employment of the optical amplifier apparatus of the present invention.

Figure 2:
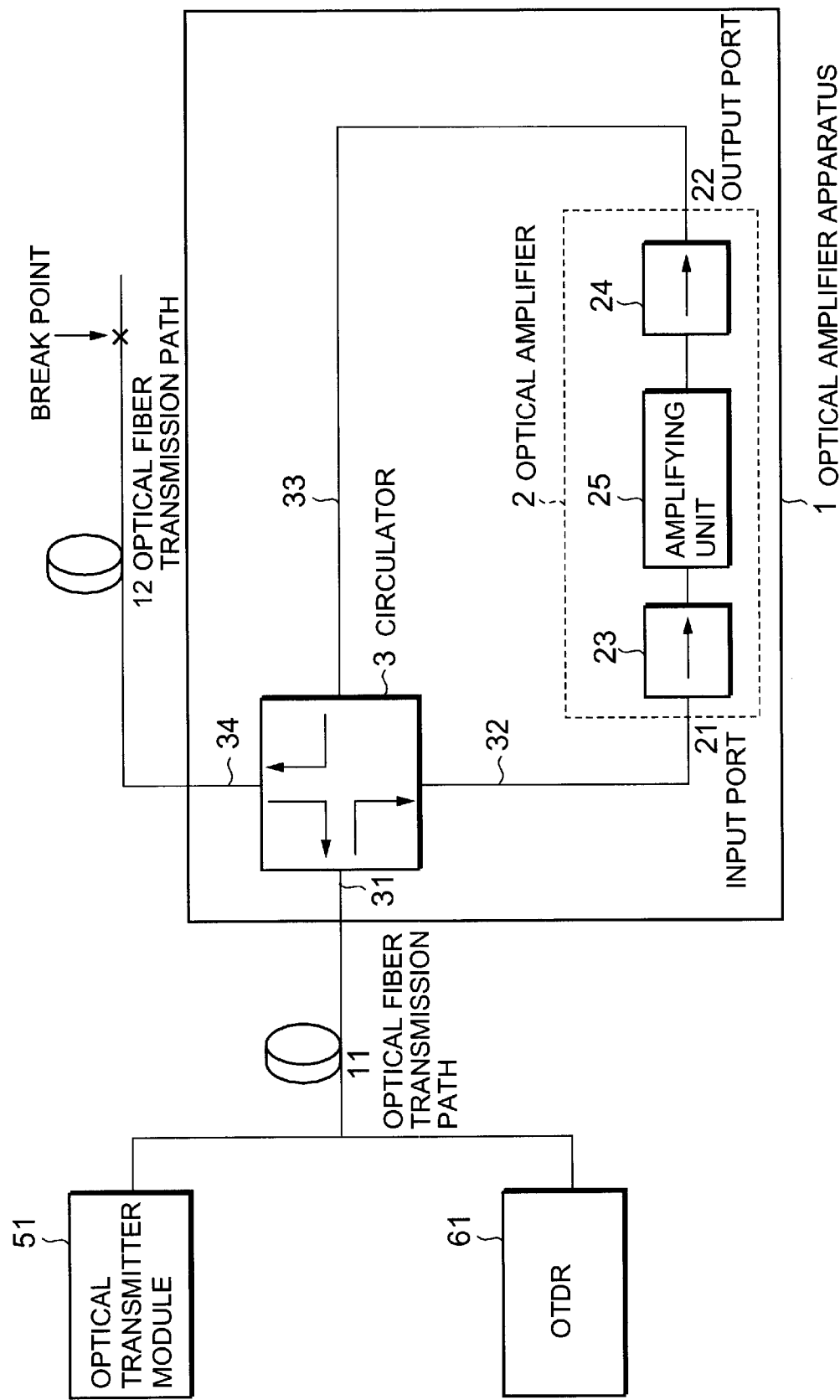
FIG. 2 is a schematic diagram showing an overall arrangement of an optical transmission apparatus equipped with a break point detecting function, according to an embodiment of the present invention, with employment of the optical amplifier apparatus shown in FIG. 1.

FIG. 2 schematically shows an overall arrangement of the optical transmission apparatus equipped with the break point detecting function, according to one preferred embodiment of the present invention, with using the above-described optical amplifying apparatus. It should be understood that the same reference numerals shown in the optical amplifying apparatus of FIG. 1 will be employed as those for indicating the same, or similar structural elements of the optical transmission apparatus shown in FIG. 2, and therefore, descriptions thereof are omitted.

An optical transmitter module 51 is connected via an optical fiber transmission path 11 to the port 31 of the optical circulator 3 employed in the optical amplifier apparatus 1. Also, an optical time domain reflectometer (will be referred to as an "OTDR" hereinafter) 61 is arranged on the side of this optical transmitter module 51. It should be noted that although the optical transmitter module 51 may be connected to the OTDR 61 via an optical coupler, if a wavelength of an optical pulse of the OTDR 61 is selected to be different from the wavelength of the optical pulse used in the normal optical transmission, then a wavelength division multiplexer may be employed so as to connect this optical transmitter module 51 to the OTDR 61.

On the other hand, another optical fiber transmission path 12 is connected to the port 34 of the optical circulator 3. It should also be noted that an optical repeating apparatus arranged subsequent to this optical fiber transmission path 12, or an optical receiver module provided at an optical terminal station is omitted in this drawing.

Break Point Detecting Operation

Next, the detecting operation of the break point by the above-explained optical transmission apparatus will now be explained.

As previously described, the light signal outputted from the side of the optical transmitter module 51 is inputted into the optical fiber transmission path 11. This signal light is optically amplified by the optical amplifier 2 via a detour path, and then, the optically amplified signal light is transmitted to the optical fiber transmission path 12 under normal condition.

In the case that conditions of the optical fiber transmission paths 11 and 12, or conditions of the optical switching apparatus and the like arranged in a half way of these optical fiber transmission paths 11 and 12 are checked, or investigated by the OTDR 61, an optical pulse is outputted from this OTDR 61. In the optical fiber transmission path 11, similar to the normal test operation, the optical pulse outputted from the OTDR 61 is received by a light receiving device (not shown) as either backward scattering light or Fresnel reflection light at a reflection point and then the conditions are detected by the OTDR 61 based upon both the time elapse from the projection of this optical pulse, and the level of the return light.

Furthermore, an optical pulse entered to the optical circulator 3 is supplied via the optical amplifier 2 to the optical fiber transmission path 12 similar to the optical transmission. The light returned from the optical fiber transmission path 12 located far from the optical circulator 3 is received by the optical receiver module of the OTDR 61 via a shortcircuit path and the optical fiber transmission path 11, without passing through the optical amplifier 2. This shortcircuit path is defined from the port 34 of the optical circulator 3 to the port 31 thereof. Similar to the above-described light detecting operation, conditions of the optical fiber transmission paths are detected by the OTDR 61 based on the time elapse defined from the projection of the optical pulse and the level of the received light. As indicated in this drawing, when a break point is present in the optical fiber transmission path 12, since the Fresnel reflection light reflected from this break point is detected, the OTDR 61 can detect as to whether or not the break point is present, and furthermore can detect the occurrence position of this break point.

In the optical transmission apparatus according to the embodiment of the present invention, even when the optical amplifier apparatus is arranged in a half way of the transmission path, the optical time domain reflectometer (OTDR) 61 can be used so as to check the conditions of the optical fiber transmission path and also to detect the break point. This is because the traveling path of the optical pulse produced from the OTDR is made different from the returning path thereof, so that the returning light is not propagated via the optical amplifier.

Now, the break point detecting operation by the above-described optical transmission apparatus equipped with the break point detecting function will be described with reference to a concrete example.

In FIG. 2, signal light having a wavelength band of 1.55 m derived from the optical transmitter module 51 is irradiated via the optical fiber transmission path 11 to the optical amplifier 1. The incident signal light is traveled through the port 31 of the optical circulator 3 and then is entered to the port 32. This incident signal light is optically amplified by the optical amplifier 2, and then the amplified signal light is entered into the port 33 of the optical circulator 3. The signal light entered to the port 33 of the optical circulator 3 is outputted from the port 34 to the optical fiber transmission path 12, and then is received by the optical receiver module.

In the case that the break point existed in the optical transmission path of this optical communication system is detected, the break-point detecting signal light having the wavelength of, for instance, 1.51 $\mu$m which is outgone from the OTDR 61 is traveled through the optical fiber transmission path 11 to be entered into the optical amplifier apparatus 1. Thereafter, as previously explained, this signal light is entered from the port 31 of the optical circulator 3, traveled through the optical amplifier 2, and thereafter, is outputted from the port 34 of the optical circulator 3 to the optical fiber transmission path 12.

When there is such a break point in the optical fiber transmission path 12, this signal light is reflected on this break point, so that the return signal light is entered to the port 34 of the optical circulator 3, and then is outputted to the port 31 of the optical circulator 3. This return signal light is detected by the OTDR 61. As a result, this OTDR 61 may detect as to whether or not the break point is present, and furthermore, may detect the distance between this OTDR 61 and the detected break point. It should also be noted that in this embodiment, the wavelength of the signal light transmitted from the optical transmitter module 51 is selected to be 1.55 $\mu$m band, whereas the wavelength of the signal light outputted from the OTDR 61 is selected to be 1.51 $\mu$m band. Alternatively, signal light having any different wavelengths may be employed as long as it may pass through the optical amplifier 2 and the optical circulator 3. Furthermore, signal light having the same wavelengths may be employed which may pass through the optical amplifier 2 and the optical circulator 3.

In accordance with the optical transmission apparatus according to the present invention, even in such a case that the optical amplifier containing the optical isolator is inserted into the transmission path, the break point present in this transmission path can be detected, and therefore, the system maintenance can be improved.

Bidirectional Optical Transmission Apparatus

Figure 3:
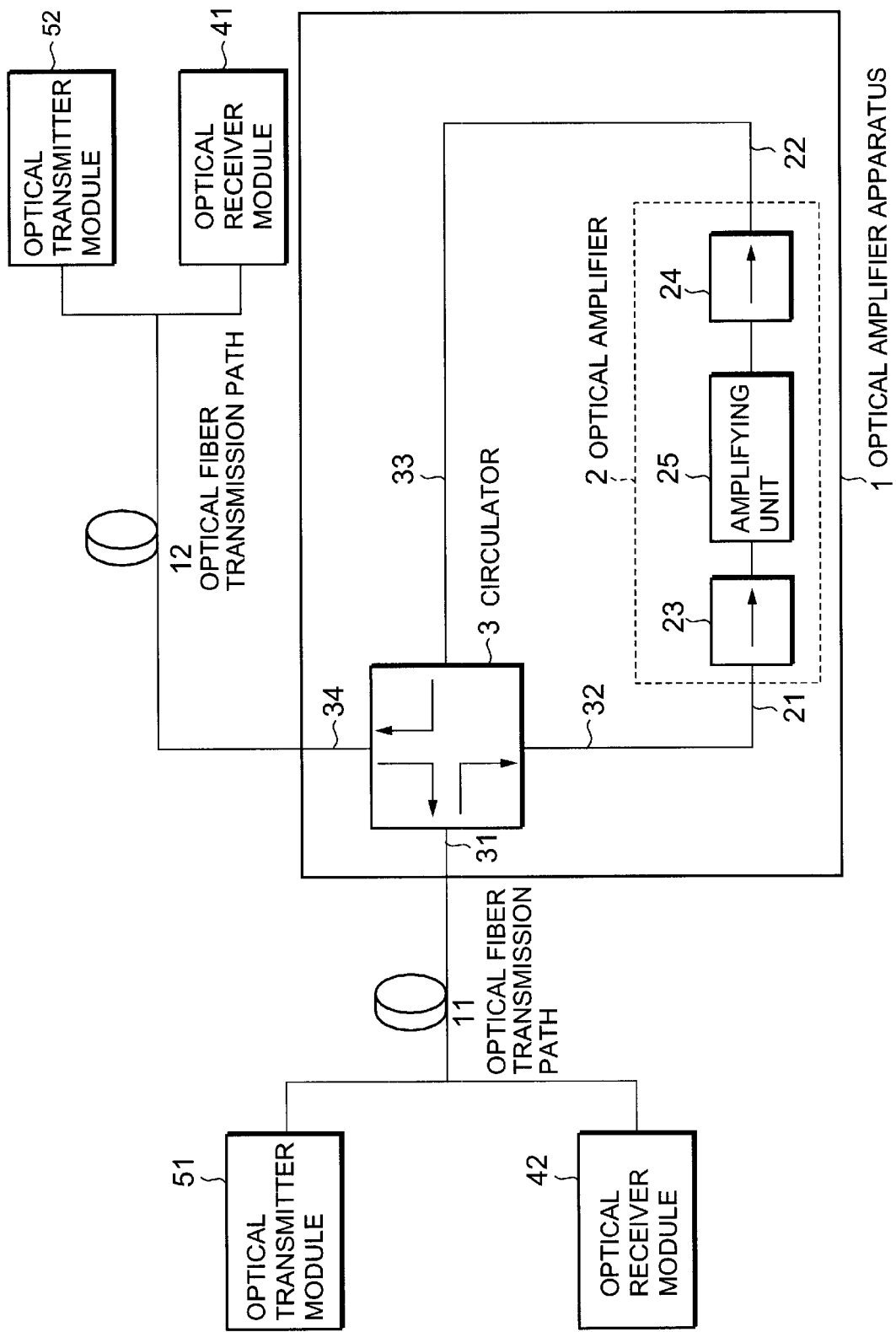
FIG. 3 is a schematic diagram showing an overall arrangement of a bidirectional optical transmission apparatus, according to an embodiment of the present invention, with employment of the optical amplifier apparatus shown in FIG. 1.
Figure 4:
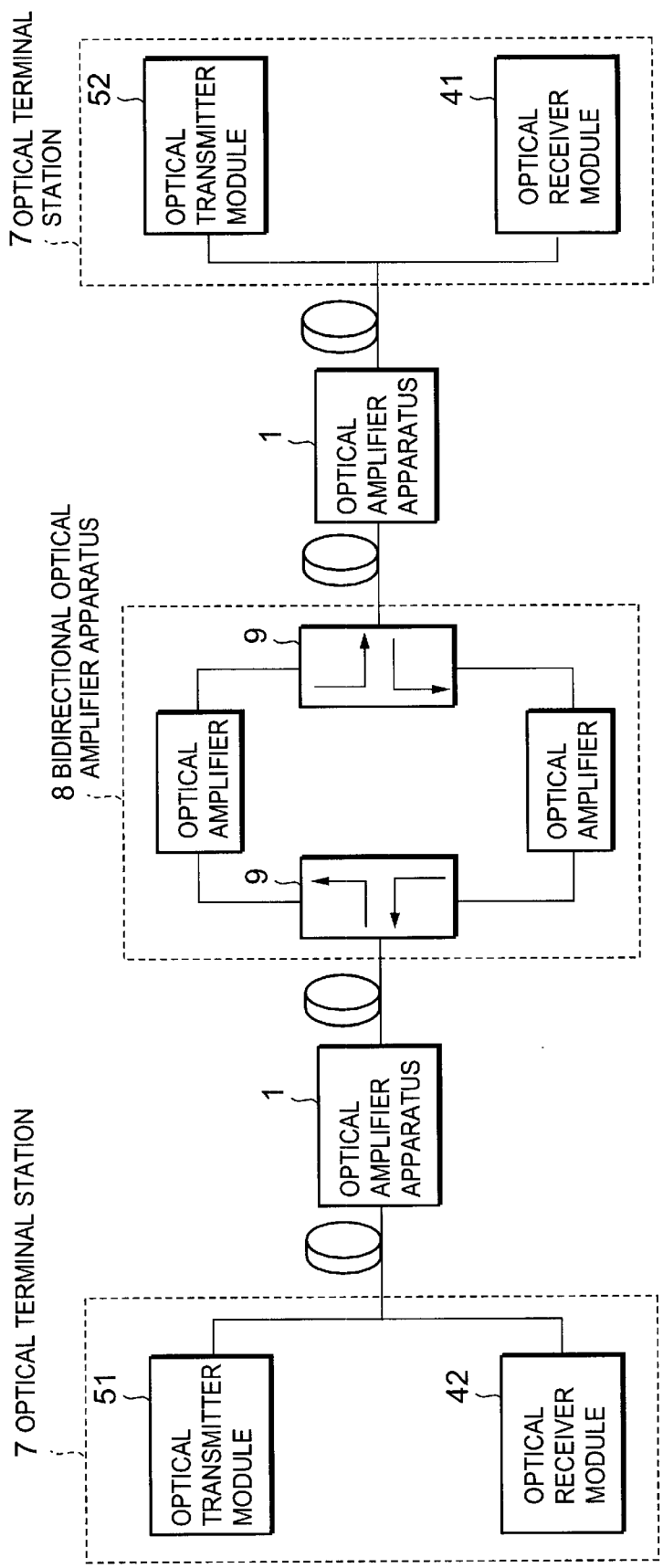
FIG. 4 is a schematic diagram showing an overall arrangement of a bidirectional optical transmission apparatus, according to another embodiment of the present invention, by using the optical amplifier apparatus shown in FIG. 1.

Referring now to FIG. 3 and FIG. 4, a bidirectional optical transmission apparatus, according to the present invention, with employment of the above-explained optical amplifier apparatus of the present invention will be described.

FIG. 3 is a schematic diagram showing an overall arrangement of a bidirectional optical transmission apparatus, according to an embodiment of the present invention, using the optical amplifier apparatus shown in FIG. 1. FIG. 4 is a schematic diagram showing an overall arrangement of a bidirectional optical transmission apparatus, according to another embodiment of the present invention, using the optical amplifier apparatus indicated in FIG. 1.

The bidirectional optical transmission apparatus indicated in FIG. 3 is provided with such an arrangement that the previously explained optical amplifier apparatus of the present invention is arranged as an optical relay apparatus between one optical terminal station 7 and another optical terminal station 7. The first-mentioned optical terminal station 7 includes an optical transmitter module 51 and an optical receiver module 42. The second-mentioned optical terminal station 7 includes an optical transmitter module 52 and an optical receiver module 41.

Since the optical amplifying apparatus of the present invention is arranged in the transmission path, downstream signal light transmitted from the optical transmitter module 51 travels via the optical fiber transmission path 11, and then is optically amplified by the optical amplifier 2 provided in the optical amplifying apparatus 1. The optically amplified downstream signal light is received via the optical fiber transmission path 12 by the optical receiver module 41. On the other hand, upstream signal light transmitted from the optical transmitter module 52 travels via the optical fiber transmission path 12, and then reaches to the optical amplifying apparatus 1. At this time, unlike the downstream signal light, this upstream signal light is directly received from the optical circulator 3 via the optical fiber transmission path 11 by the optical receiver module 42.

In an optical communication system, for instance, as the bidirectional optical transmission apparatus of this embodiment, signal light having a wavelength band of 1.55 $\mu$m is used as the downstream signal light, whereas signal light having a wavelength band of 1.51 $\mu$m is used as the upstream signal light. The signal light having the wavelength band of 1.55 $\mu$m transmitted from the optical transmitter module 51 is entered via the optical fiber transmission path 11 to the optical amplifier 1. The inputted downstream signal light travels through the port 31 of the optical circulator 3, and then is entered into the port 32. Then, this downstream signal light is amplified by the optical amplifier 2, and then the amplified signal light is entered into the port 33 of the optical circulator 3. Thereafter, this amplified downstream signal light which is entered into the port 33 of the optical circulator 3 is outputted from the port 34 to the optical fiber transmission path 12, and then is received by the optical receiver module 41. On the other hand, the upstream signal light having the wavelength band of 1.51 $\mu$m and transmitted from the optical transmitter module 52 is inputted to the port 34 of the optical circulator 3, and then is outputted to the port 31 of the optical circulator 3. This upstream signal light is received by the optical receiver module 42.

It should also be noted that in this embodiment, the wavelength of the signal light transmitted from the optical transmitter module 51 is selected to be 1.55 $\mu$m as the downstream signal light, whereas the wavelength of the signal light transmitted from the optical transmitter module 52 is selected to be 1.51 $\mu$m as the upstream signal light. Alternatively, as the downstream signal light, signal light having any wavelengths may be employed as long as it may pass through the optical amplifier 2 and the optical circulator 3. Also, as the upstream signal light, signal light having any wavelengths may be employed as long as it may pass through the optical circulator 3. Moreover, both upstream signal light and downstream signal light may have the same wavelengths.

Since the optical amplifying apparatus according to the present invention is employed in the optical relay apparatus, the bidirectional optical transmission can be carried out even when the optical amplifier is arranged in this optical switching apparatus. In particular, when only one signal light, for example, only downstream signal light is desired to be relayed and amplified, this inventive idea is very useful.

Combined Arrangement of Optical Amplifier Apparatus and Bidirectional Optical Amplifier Apparatus FIG. 4 schematically shows a structural example of a combination between the optical amplifier apparatus according to the present invention and a bidirectional optical amplifier apparatus according to the present invention. In this embodiment, two optical amplifier apparatus 1 according to the present invention are arranged between optical terminals 7, and one bidirectional optical amplifier apparatus 8 is arranged between two optical terminal stations 7. As a result, in this embodiment, downstream signal light is optically amplified three times (in total) in the optical fiber transmission path, whereas upstream signal light is optically amplified only once in this optical fiber transmission path. It should be noted that the structure of this optical amplifier apparatus 1 is identical to the previously explained structure of the optical amplifier apparatus according to the present invention. On the other hand, although the structure of the bidirectional optical amplifier apparatus 8 becomes more complex than that of the optical amplifier apparatus 1, this bidirectional optical amplifier apparatus 8 is comprised of two 3-port optical circulators 9.

With employment of such an arrangement, even when the gains of the downstream signal light and of the upstream signal light, which are wanted to be optically amplified, are different from each other, the respective signal light can be optically amplified only by the desirable gain and then the optically amplified signal light can be optically transmitted in the optical switching apparatus.

As apparent from the foregoing descriptions, the above-explained arrangement is not limited to this example.

Alternatively, the optical amplifier apparatuses maybe arranged in a proper manner at necessary places by calculating the gains required for the respective signal light. Furthermore, alternatively, "n" pieces of optical amplifier apparatus according to the present invention may be connected in series to each other (symbol "n" being arbitrary number). Alternatively, the upstream transmission path and the downstream transmission path may be alternately replaced by each other so as to constitute a bidirectional optical transmission system.

As previously explained in detail, in accordance with the optical amplifying apparatus of the present invention, while the optical circulator allows only the signal light to be optically amplified to pass through the optical amplifier, whereas light which travels along the opposite (reverse) direction does not pass through the optical amplifier. As a result, even in such a case that either the signal light or light is transmitted along the bidirection, the optical amplifier can be arranged in the transmission path.

Also, in accordance with the optical transmission apparatus equipped with the break point detecting function of the present invention, even when the optical amplifier containing the optical isolator is inserted into the transmission path, the break point in the transmission path can be detected, so that the maintenability can be improved.

Moreover, by using the optical amplifying apparatus of the present invention for the optical relay apparatus, even in the case that the optical amplifier is arranged in the optical relay apparatus, the bidirectional optical transmission can be obtained. In particular, when only one of the above-explained signal light, for instance, only the downstream signal light is wanted to be relayed/amplified, this optical relay apparatus is effective.

While this invention has been described in connection with certain preferred embodiments. It is to be understood that the subject matter encompassed by way of this invention is not to be limited to those specific embodiments. On the contrary, it is intended for the subject matter of the invention to include all alternative. Modification and equivalents as can be included within the spirit and scope of the following claims.

What is claimed is:

1. An optical amplifier apparatus comprising:
    an optical amplifier for optically amplifying first signal light inputted from an input port thereof and for outputting the first amplified signal light from an output port thereof;
    an optical circulator equipped with at least four ports through which light is inputted/outputted, in which light inputted from a first port thereof is outputted from another port thereof;
    a first optical isolator arranged at a pre-stage of said optical amplifier; and
    a second optical isolator arranged at a post-stage of said optical amplifier,
    wherein said input port of the optical amplifier is connected to the second port of said four ports, said output port of the optical amplifier is connected to said third port, the first signal light is entered to the first port for outputting light to said second port, second signal light is entered to the fourth port for outputting the light inputted to the third port, and said second signal light is outputted from said first port.

2. An optical transmission apparatus equipped with a break point detecting function, comprising:
    the optical amplifier apparatus as recited in claim 1;
    a first optical transmitter module for transmitting said first signal light; and
    an optical time domain reflectometer for outputting an optical pulse along the same direction as that of said first signal light.

3. An optical transmission apparatus equipped with a break point detecting function as claimed in claim 2 wherein:
    said optical time domain reflectometer is comprised of:
    an optical pulse light source for outputting said optical pulse;
    an optical coupler for coupling said first signal light to said optical pulse; and
    a light receiver module for receiving light returned by said optical pulse.

4. A bidirectional optical transmission apparatus comprising:
    the optical amplifier apparatus as recited in claim 1;
    a first optical transmitter module for transmitting said first signal light;.
    a second optical transmitter module for transmitting said second signal light;
    a first optical receiver module for receiving said amplified signal light outputted from said optical amplifier apparatus; and
    a second optical receiver module for receiving said second signal light.

5. A bidirectional transmission apparatus as claimed in claim 4, further comprising:
    a bidirectional optical amplifying relay device for optically amplifying said first signal light and said second signal light.

* * * * *